US009697041B2

(12) United States Patent
Guan et al.

(10) Patent No.: US 9,697,041 B2
(45) Date of Patent: Jul. 4, 2017

(54) METHOD FOR DYNAMIC INTERRUPT BALANCED MAPPING BASED ON CURRENT SCHEDULING STATES OF VCPUS

(71) Applicant: SHANGHAI JIAO TONG UNIVERSITY, Shanghai (CN)

(72) Inventors: Haibing Guan, Shanghai (CN); Jian Li, Shanghai (CN); Ruhui Ma, Shanghai (CN); Minjun Zhu, Shanghai (CN); Fanfu Zhou, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 276 days.

(21) Appl. No.: 14/412,188

(22) PCT Filed: Apr. 14, 2014

(86) PCT No.: PCT/CN2014/075253
§ 371 (c)(1),
(2) Date: Dec. 30, 2014

(87) PCT Pub. No.: WO2015/106497
PCT Pub. Date: Jul. 23, 2015

(65) Prior Publication Data
US 2016/0259664 A1 Sep. 8, 2016

(30) Foreign Application Priority Data
Jan. 15, 2014 (CN) .......................... 2014 1 0018108

(51) Int. Cl.
G06F 13/24 (2006.01)
G06F 15/173 (2006.01)
(Continued)

(52) U.S. Cl.
CPC ........ *G06F 9/4812* (2013.01); *G06F 9/45504* (2013.01); *G06F 9/45558* (2013.01);
(Continued)

(58) Field of Classification Search
None
See application file for complete search history.

(56) References Cited

U.S. PATENT DOCUMENTS 7,334,086 B2 * 2/2008 Hass ................... G06F 12/0813
709/251
2009/0031304 A1 1/2009 Song
(Continued)

FOREIGN PATENT DOCUMENTS

CN 101382923 A 3/2009

*Primary Examiner* — Hyun Nam
(74) *Attorney, Agent, or Firm* — Hovey Williams LLP

(57) ABSTRACT

The invention discloses a method for dynamic interrupt balanced mapping method based on the current scheduling states of VCPUs. When the virtual I/O APIC of an SMP virtual machine needs to map a virtual interrupt into a VCPU of the virtual machine after receiving the virtual interrupt, a part of VCPUs in the active state are analyzed according to the scheduling states of all VCPUs of the current VM in a VMM scheduler, and the virtual interrupt is mapped into the active VCPUs to obtain lower interrupt processing delay. If a plurality of VCPUs are in the active state simultaneously, the interrupt load of each active VCPU is considered further, and the interrupt is mapped into the active VCPU with the current lowest current load to further ensure balancing of interrupt processing loads of all VCPUs, and therefore, the loads of VCPUs in the SPMP structure are more symmetrical to promote balancing of the overall performance of all VCPUs in the SMP structure.

9 Claims, 2 Drawing Sheets

(51) Int. Cl.
*G06F 9/48* (2006.01)
*G06F 9/455* (2006.01)
*G06F 9/46* (2006.01)

(52) U.S. Cl.
CPC ............... *G06F 9/461* (2013.01); *G06F 9/48* (2013.01); *G06F 13/24* (2013.01); *G06F 2009/45579* (2013.01)

(56) References Cited

U.S. PATENT DOCUMENTS

| | | | | |
|---|---|---|---|---|
| 2009/0113110 | A1* | 4/2009 | Chen | G06F 9/4426 711/6 |
| 2011/0202699 | A1 | 8/2011 | Van Riel | |
| 2014/0317265 | A1* | 10/2014 | James | H04L 67/1004 709/224 |
| 2015/0121377 | A1* | 4/2015 | Zang | G06F 9/45558 718/1 |
| 2015/0317179 | A1* | 11/2015 | Fahrig | G06F 9/5077 718/1 |

* cited by examiner

METHOD FOR DYNAMIC INTERRUPT BALANCED MAPPING BASED ON CURRENT SCHEDULING STATES OF VCPUS

FIELD OF THE INVENTION

The invention relates to the fields of computer system virtualization, virtual machine interrupt processing and virtual machine schedulers, and more particularly to a method for dynamic interrupt balanced mapping based on the current scheduling states of Virtual CPUs.

DESCRIPTION OF THE PRIOR ART

The virtualization technology generally integrates the computing or the storing functions which are achieved originally by a plurality of physical equipment into one relatively powerful physical server, thereby realizing the integration and the reallocation of hardware resources, increasing the utilization rate of the hardware equipment, and playing an important role in cloud computing and data center construction. Compared with the real physical equipment, the virtual equipment has obvious advantages: firstly, the cloud computing and the virtualization technology allow business users to use virtual machines for operation and therefore, the users do not need to purchase a set of real IT equipment, which effectively reduces the economic costs and the management costs of the business users for maintaining IT infrastructure; secondly, the mode of creating a virtual machine based on mirror is flexible and practical, and server disaster recovery, rebuilding, bulk copy and the like can be handled better by means of a mirror backup technology; in addition, the method for managing virtual machines based on the Virtual Machine Monitor (VMM) can flexibly handle the mapping relations between physical resources and virtual resources from the level of software and hardware and provide a series of necessary functions of performance isolation, safety isolation, state monitoring and the like.

The virtual machine monitor means a software management tier existing between hardware and the traditional operating systems and has the main functions of managing real physical equipment, such as physical CPU, memory and the like and abstracting the underlying hardware into corresponding virtual device interfaces so as to enable a plurality of operating systems to obtain the required virtual hardware respectively, and therefore, the operating systems can operate in the same physical equipment simultaneously.

The virtual machine monitor introduced between the physical equipment and the virtual operating systems is used as a middle tier, which affects the performance of the virtual operating systems inevitably, wherein one important aspect is that the response delay of the interrupt is increased. When a plurality of VCPUs share one physical CPU, the physical CPU needs to be time-division-multiplexed, and the waiting time of the VCPUs in the VMM scheduling queue is reflected in the response time of the VCPUs to events, thereby enabling the response delay of the interrupt and other events to increase seriously.

At present, the research on the virtual interrupt delay in academia mainly focuses on single-core virtual machines. In a single-core virtual machine, one virtual machine only has one VCPU, and therefore the interrupt delay is solved by means of shortening the length of the time slice of time division multiplexing of the physical CPU, increasing the switch frequency between the VCPUs and increasing opportunities for seizing. These methods can reduce scheduling delay to a certain extent, but simultaneously increase the context switch frequency of VCPUs inevitably, thereby bringing in additional system expenses; therefore, the computing capability of the CPU is wasted. Currently, the research on the virtual machine with a Symmetric Multi-Processor (SMP) architecture mostly focuses on the co-scheduling of the VCPUs, i.e. synchronization and communication between a plurality of VCPUs in the virtual machine, while the research on the delay of the interrupt and other events is relatively less.

At present, in embodiments of the VMM, such as implementation of KVM and XEN, the interrupt in the virtual machine is mainly processed by means of the virtual interrupt processing device. In the XEN, the virtual machine includes two types of full virtualization and para-virtualization according to the mode of virtualization. In the mode of full virtualization, the virtual operating system does not need any modification, and the XEN realizes processing of the virtual interrupt by means of a virtual interrupt processing platform; while in the mode of para-virtualization, the kernel of the virtual operating system needs modifying so as to adapt to the operating system of the host, and the XEN realizes processing of the interrupt and events by means of an event channel mechanism. The KVM has no difference between full virtualization and para-virtualization, and the interrupt of the virtual machine is processed by means of the virtual interrupt processing device in the KVM.

In the interrupt architecture of the virtual machine, as with the physical platform, each VCPU corresponds to a virtual local APIC (Advanced Programmable Interrupt Controller) to receive the interrupt, the virtual platform also comprises a virtual I/O APIC, a virtual PIC and other virtual devices to send the interrupt. As with the VCPUs, the virtual I/O APIC, the virtual local APIC and the virtual PIC are software entities maintained by the VMM. Generally, the virtual devices of the virtual machine with the SMP architecture, such as virtual network adapter and the like, calls the virtual I/O APCI to send an interrupt request, and the virtual I/O APIC selects a VCPU as a receiver of the interrupt according to the mapping relations between the interrupt and the VCPUs so as to send the interrupt request to the virtual local APIC of the target VCPU. The virtual local APIC further uses the VT-x (Intel Virtualization Technology eXtension) event injection mechanism to finally inject the virtual interrupt.

It should be pointed out that in the virtual machine with the architecture of a plurality of VCPUs, each VCPU time-division multiplex the physical CPU according to the scheduling of the scheduler so that the situation that a part of VCPUs are in the active state and a part of VCPUs are in the queuing state occurs. In the existing virtual machine interrupt processing technology, when it needs to map the interrupt request into the VCPUs, the virtual I/O APIC does not take into account the current scheduling states of the VCPUs, and allocates blindly the VCPUs for the interrupt. When the virtual interrupt is allocated to a VCPU in the scheduling waiting state, the waiting delay of the VCPU in the scheduling queue becomes a part of the response delay of the interrupt, thereby greatly increasing the response delay of the interrupt request and reducing the processing rate of the interrupt request.

SUMMARY OF THE INVENTION

In consideration of the defects of the prior art, the technical problem to be solved by the invention is to provide a method for dynamic interrupt balanced mapping based on the scheduling states of the current VCPUs and the analysis of the interrupt processing load. When the interrupt is mapped, not only the scheduling states of the VCPUs as the target structure of interrupt mapping in the VMM scheduler are considered, but also the balancing of the interrupt loads of all VCPUs is considered, thereby effectively reducing the interrupt processing delay.

To achieve the above purpose, the invention provides a method for dynamic interrupt balanced mapping based on the current scheduling states of the VCPUs and the analysis of the interrupt processing load, characterized in that, when the virtual I/O APIC of the SMP virtual machine needs to map a virtual interrupt into a certain VCPU of the virtual machine after receiving the virtual interrupt, a part of VCPUs in the active state are analyzed according to the scheduling states of all VCPUs of the current VM in the VMM scheduler, and the virtual interrupt is mapped into the active VCPUs so as to obtain lower interrupt processing delay. If a plurality of VCPUs are in the active state simultaneously, the interrupt load of each active VCPU is considered further, and the interrupt is mapped into the active VCPU with the lowest current load so as to realize balancing of the interrupt loads of the VCPUs.

The invention provides a method for dynamic interrupt balanced mapping based on the current scheduling states of the VCPUs. The method comprises the following steps:

(a) Whenever the virtual hardware generates a virtual interrupt, a virtual I/O APIC receives the virtual interrupt and transmits the virtual interrupt to the virtual local APIC of a target VCPU.

(b) An interrupt balanced allocator intercepts the virtual interrupt before the virtual interrupt is transmitted to the virtual local APIC of the target VCPU.

(c) The interrupt balanced allocator checks the scheduling state information provided by a scheduler so as to obtain a list of the VCPUs in the active state.

(d) The interrupt balanced allocator reselects a target VCPU according to the list of the VCPUs in the active state.

(e) The interrupt balanced allocator transmits the virtual interrupt to the virtual local APIC of the target VCPU reselected in Step (d).

(f) The virtual local APIC of the target VCPU injects the virtual interrupt into the target VCPU.

Further, the method for selecting the target VCPU in Step (d) comprises the following steps:

(d1) Obtain the number of the VCPUs in the list of the VCPUs in the active state.

(d2) If the number is zero, select the target VCPU according to the scheduling state information; if the number is one, select the VCPU in the list of the VCPUs in the active state as the target VCPU; if the number is greater than one, select the target VCPU according to the interrupt loads of the VCPUs in the list of the VCPUs in the active state.

When the list of the VCPUs in the active state contains only one VCPU, select the VCPU as the target VCPU, and map the virtual interrupt into the active VCPU so as to obtain lower interrupt processing delay.

Further, the method for selecting the target VCPU according to the scheduling state information in Step (d2) comprises the following steps:

(d2.1) Read the scheduling state information.

(d2.2) Select a VCPU predicted to enter the active state fastest from all the VCPUs as the target VCPU.

When the list of the VCPUs in the active state contains no VCPU, i.e. no VCPU is in the active state, select a VCPU predicted to enter the active state fastest as the target VCPU, and map the virtual interrupt into the active VCPU so as to obtain lower interrupt processing delay.

Further, in Step (d2.2), the VCPU entering the active state fastest is predicted based on that the VCPU is in the idle state.

The VCPU in the idle state possibly enters the active state fastest, because a CREDIT scheduler is designed to allow the VCPUs in the IDLE state to seize response events when required, select the VCPU in the idle state as the target VCPU and map the virtual interrupt into the VCPU so as to obtain lower interrupt processing delay.

Further, if all the VCPUs are not in the idle state, the VCPU entering the active state fastest in Step (d2.2) is predicted based on the position in a waiting queue and the remaining credit value of the VCPU.

For all VCPUs, the positions in the respective waiting queues are considered preferably, and the VCPUs closer to the head of the queue enter the active state fastest more likely. Then, when the VCPUs in the same position exist, consider the remaining credit value and select the VCPU with the largest remaining credit value as the target VCPU so as to obtain lower interrupt processing delay.

Further, the method for selecting the target VCPU according to the interrupt loads of the VCPUs in the list of the VCPUs in the active state in Step (d2) comprises the following steps:

(d2.3) Read a VCPU interrupt load list maintained by the current virtual machine structure.

(d2.4) Compare the interrupt loads of the VCPUs in the list of the VCPUs in the active state to select the VCPU with the smallest interrupt load as the target VCPU.

When the VCPU list in the active state contains a plurality of VCPUs, map the virtual interrupt into the active VCPU with the smallest current interrupt load, and realize balancing of the interrupt loads of the VCPUs while obtaining lower interrupt processing delay.

Further, the virtual hardware in Step (a) comprises virtual devices and/or physical devices whose interrupt is processed by means of the VMM.

Further, the virtual interrupt is injected by means of a VT-x event injection in Step (f).

Further, a member variable sched_info is added on the basis of the SHARED_INFO structure of the virtual machine so as to record the scheduling states of the VCPUs.

Further, whenever the scheduler switches VCPUs once, after the swap-in VCPU and the swap-out VCPU complete context switch, the swap-in VCPU becomes the active VCPU, the member variable sched_info of the SHARED_INFO structure of the virtual machine which the active VCPU belongs to is marked as active, and the member variable sched_info of the SHARED_INFO structure of the virtual machine which the swap-out VCPU belongs to is marked as waiting.

Compared with the prior art, the method for dynamic interrupt balanced mapping based on the current scheduling states of the VCPUs, provided by the invention, has the following technical advantages:

(1) According to the current scheduling states of the VCPUs, map the virtual interrupt into the active VCPU, and therefore, the interrupt request processing delay caused by scheduling delay is effectively reduced so as to ensure that the virtual interrupt is injected into the target VCPU in time, obtain lower interrupt processing delay and increase the interrupt response speed.

(2) When a plurality of VCPUs are in the active state, select the VCPU with the smallest interrupt load as the target VCPU to further ensure balancing of the interrupt processing loads of VCPUs so that the loads of the VCPUs in the SMP structure are more symmetrical so as to promote balancing of the overall performance of all VCPUs in the SMP structure.

(3) The scheme of the invention has no requirement of shortening the length of the time slice of the scheduling period, increasing the context switch frequency of the VCPUs or introducing a new seizing mechanism among the VCPUs, so the invention does not cause waste of additional computing capability while effectively reducing the interrupt response delay, which benefits the operation of calculation intensive loads and ensures higher CPU utilization rate.

(4) Because the interrupt plays an important role in the operating system, increasing the interrupt processing rate can enhance the overall response capability of the virtual machine to a certain extent.

DETAILED DESCRIPTION OF THE PREFERRED EMBODIMENTS

The conception, the detailed structure and the technical effects of the invention are further described with accompanying drawings to understand the purposes, the characteristics and the effects of the invention.

Figure 1:
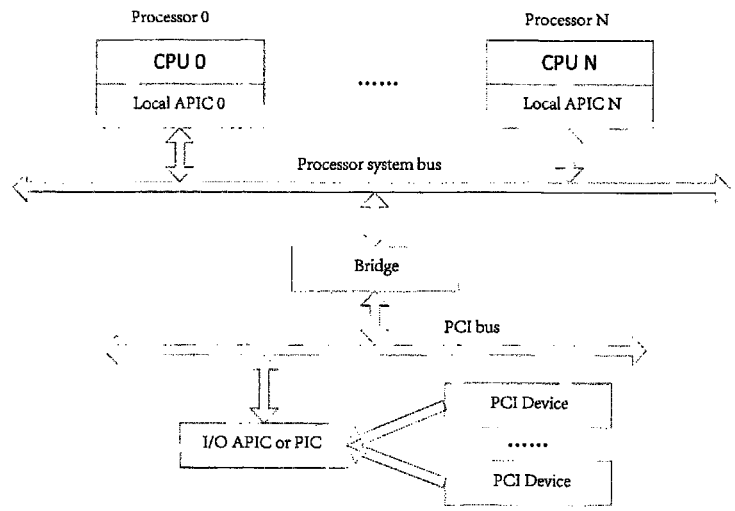
FIG. 1 is a structural schematic view of interrupt processing on a physical platform.

FIG. 1 is a structural schematic view of interrupt processing on a physical platform. On the physical platform, firstly, an I/O device sends an interrupt request by means of an interrupt controller (I/O APIC or PIC); then the interrupt request is transmitted to a system bus via a PCI bus; finally, the local APIC component of the target CPU receives the interrupt, and the target CPU begins to process the interrupt.

Figure 2:
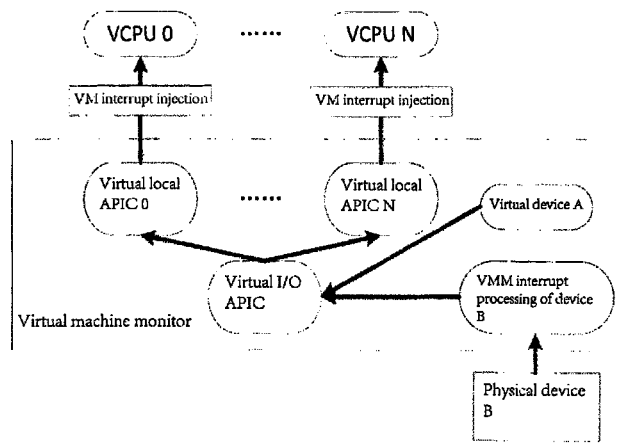
FIG. 2 is a structural schematic view of the virtual interrupt processor in the existing SMP virtual machine technology.

FIG. 2 is a structural schematic view of the virtual interrupt processor in the exiting SMP virtual machine technology. In the virtual machine environment, the VMM also needs to present a virtual interrupt architecture similar to a physical interrupt architecture for the guest operating systems. As with the real physical platform, in the virtual SMP architecture, each VCPU also corresponds to a virtual local APIC for receiving an interrupt, while the VMM provides the virtual I/O APIC for sending an interrupt. When a certain virtual device, such as virtual network adapter and the like, needs to send an interrupt, the virtual device firstly calls an interface provided by the virtual I/O APIC to send the interrupt. The virtual I/O APIC selects a VCPU as the processor of the interrupt according to the received interrupt request, and delivers the interrupt to the local APIC corresponding to the VCPU. Finally, the virtual local APIC injects the interrupt into the corresponding target VCPU by means of the VT-x event injection mechanism, and the interrupt is processed by the VCPU. Similar to the VCPUs, the virtual local APICs, the virtual I/O APIC, the virtual PIC and the like involved in the virtual interrupt processor are also software entities maintained by the VMM.

Figure 3:
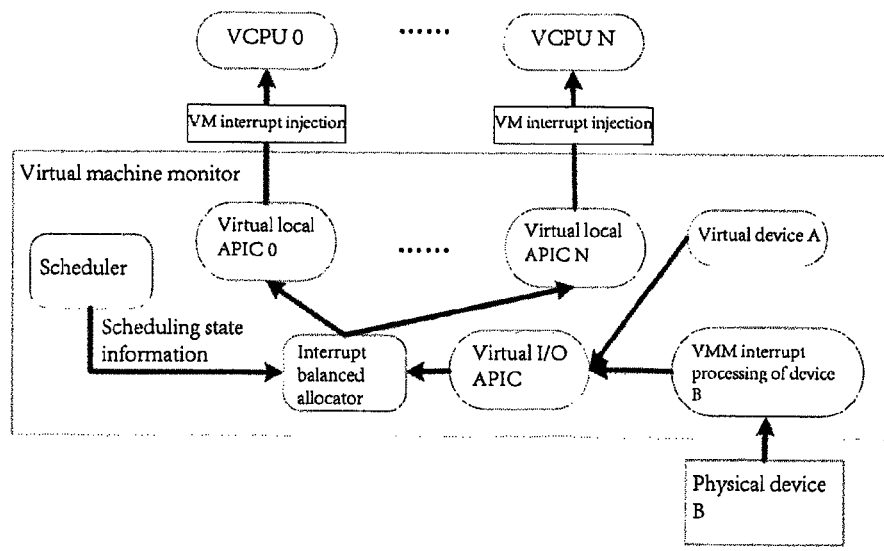
FIG. 3 is a schematic view of the virtual interrupt processor of one embodiment of the invention.

FIG. 3 is a schematic view of the virtual interrupt processor of one embodiment of the invention. Compared with the existing virtual interrupt processor, the virtual interrupt processor in the embodiment adds an interrupt balanced allocator which is located between the original virtual I/O APIC and the virtual local APIC.

The interrupt balanced allocator reads the basic scheduling information of the VCPUs from the VMM scheduler and analyzes the scheduling states of the VCPUs of the virtual machine at the current moment, i.e. which VCPUs are in the active state and which VCPUs are in the scheduling waiting state. When the virtual I/O APIC needs to send an interrupt request, the interrupt balanced allocator intercepts the interrupt request and substitutes the virtual I/O APIC to select the target VCPU for processing the interrupt according to the existing knowledge so as to transmit the interrupt to the virtual local APIC of the target VCPU to initiate interrupt injection.

Figure 4:
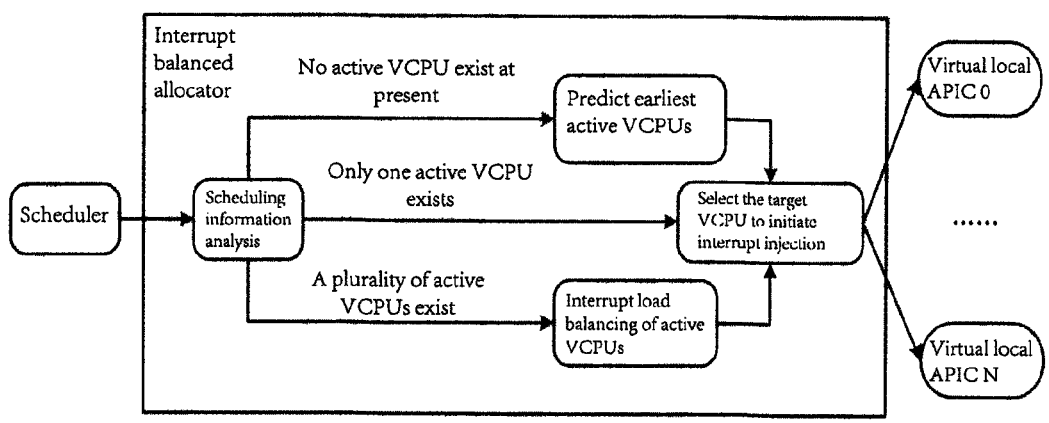
FIG. 4 is a schematic view of the establishment process of the virtual interrupt mapping of the virtual interrupt processor as shown in FIG. 3.

FIG. 4 is a schematic view of the establishment process of the virtual interrupt mapping of the virtual interrupt processor as shown in FIG. 3. In the figure, the working process of the interrupt balanced allocator is specified. When the interrupt balanced allocator needs to process an interrupt request, the interrupt balanced allocator firstly analyzes the scheduling and the interrupt load of each VCPU of the current virtual machine based on the scheduling information obtained from the scheduler.

If only one active VCPU exists at the current moment, i.e. only one of the VCPUs of the virtual machine currently has acquired the actual operation right and is running in the physical CPU, record the VCPU as the target VCPU.

If no VCPU is in the active state at the current moment, i.e. all VCPUs of the virtual machine are in the waiting queue of the scheduler, the interrupt balanced allocator predicts the possibility of each VCPU to enter the active state, and selects the VCPU entering the active state fastest as the target VCPU. Prediction is based on the information provided by the scheduler, for example, whether or not the VCPUs in the IDLE state, the remaining credit value of each VCPUs in the CREDIT scheduler and the like. Generally, in the CREDIT scheduler, the VCPU in the IDLE state is most suitable target, because the CREDIT scheduler is designed to allow the VCPU in the IDLE state to seize response events when required. For all VCPUs, the positions in the respective waiting queues are considered preferentially, and the VCPU closer to the head of the queue enters the active state fastest more likely. Then, when the VCPUs in the same position exist, consider the remaining credit value and select the VCPU with the largest remaining credit value as the target VCPU so as to obtain lower interrupt processing delay.

If a plurality of VCPUs are in the active state at present, the interrupt balanced allocator successively reads the interrupt load of each VCPU in the active state to select the VCPU with the smallest load as the target VCPU. After determining the target VCPU, the interrupt balanced allocator continues the interrupt processing procedure and substitutes the virtual I/O APIC to initiate interrupt injection.

According to the invention, the method for dynamic interrupt mapping, interrupt balanced allocating based on the current active state of the VCPUs and the analysis of the interrupt processing load of the VCPUs, comprises the following steps:

Step 1: Whenever the VCPU scheduler of the VMM effectively switches VCPUs once, after the swap-in VCPU and the swap-out VCPU complete context switch, the swap-in VCPU becomes the active VCPU which running actually in the physical CPU. At this time, the virtual machine structure which the VCPU belongs to marks the state of the swap-in VCPU as active according to the ID of the VCPU, and marks the state of the swap-out VCPU as waiting simultaneously.

Step 2: Whenever a virtual device generates a virtual interrupt to be processed, intercept the virtual interrupt before the virtual interrupt is mapped into the VCPU by the virtual I/O APIC, and check the VCPU state list of the current virtual machine simultaneously so as to obtain the list of the VCPUs in the active state. If the active VCPU list contains only one VCPU, select the VCPU as the target VCPU and go to Step 5; if no VCPU is in the active state at the current moment, go to Step 3; if more than one VCPU is in the active state, go to Step 4.

Step 3: If no VCPU is in the active state at the current moment, predict a VCPU entering the active state earliest according to the scheduling information of each VCPU provided by the scheduler select the VCPU as the target VCPU, and go to Step 5.

Step 4: When a plurality of VCPUs in the active state exist, further read the VCPU interrupt load list maintained by the current virtual machine structure, compare the current interrupt loads of all active VCPUs, and select the VCPU with the relatively smallest load as the target VCPU.

Step 5: Update the interrupt load state of the target VCPU, map the current virtual interrupt into the dynamically selected target VCPU, and finally continue completing interrupt injection.

Particularly, the implementation of the interrupt mapping scheme of the invention is mainly divided into two parts, wherein the first part comprises the following steps:

Step 1: Add a new member variable sched_info on the basis of the SHARED_INFO structure of the original virtual machine to record the scheduling state of the VCPU. The main code of the step is implemented as follows:

```
struct shared_info {
...
uint64_t sched_info;
}
```

Step 2: Whenever the VCPU scheduler of the VMM effectively switches VCPUs once, after the swap-in VCPU and the swap-out VCPU complete context switch, the swap-in VCPU becomes the active VCPU which running actually in the physical CPU. At this time, the virtual machine structure which the VCPU belongs to marks the state of the swap-in VCPU as active according to the ID of the VCPU, and marks the state of the swap-out VCPU as waiting simultaneously. The main code of the step is implemented as follows:

```
static void schedule(void) ( )
{
...
context_switch(prev, next);
if (check_pre_ok(prev, next))
{
prev->domain->shared_info->native.sched_info=((prev->domain-
>shared_info->native.sched_info>>(prev->vcpu_id-1))-1)<<(prev-
>vcpu_id-1);
next->domain->shared_info->native.sched_info=((next->domain-
>shared_info->native.sched_info>>(next->vcpu_id-1))+1)<<(next-
>vcpu_id-1);
}
context_switch(prev, next);
}
```

In the second part of the implementation of the invention, the interrupt mapping scheme of the existing virtual I/O APIC for the virtual interrupt is modified. The specific process comprises the following steps:

Step 1: Whenever the VMM generates a virtual interrupt, the virtual I/O APIC intercepts the virtual interrupt before the virtual interrupt is mapped into the VCPU and checks the VCPU state list of the current virtual machine simultaneously so as to obtain the list of the VCPUs in the active state. If the active VCPU list contains only one VCPU at the current moment, select the VCPU as the target VCPU and go to Step 4; if no VCPU is in the active state at the current moment, go to Step 2; if more than one VCPU is in the active state, go to Step 3.

Step 2: If no VCPU is in the active state at the current moment, predict a VCPU entering the active state earliest according to the scheduling information of each VCPU provided by the scheduler, select the VCPU as the target VCPU and go to Step 4.

Step 3: When a plurality of VCPUs in the active state exist, further read the VCPU interrupt load list maintained by the current virtual machine structure, compare the current interrupt loads of all active VCPUs, select the VCPU with the relatively smallest load as the target VCPU and go to Step 4.

Step 4: Update the interrupt load state of the target VCPU, map the current virtual interrupt into the dynamically selected target VCPU, and continue completing interrupt injection.

The core code of the part is implemented as follows:

```
static void vioapic_deliver(struct hvm_hw_vioapic *vioapic, int irq)
{
...
target = target_search( );
ioapic_inj_irq(vioapic, target, vector, trig_mode, delivery_mode);
}
struct vlapic *target_search(struct domain *d)
{
int target_vcpu=0;
uint64_t tmp= d->vcpu[d->shared_info->native. sched_info;
if (tmp==0)
{
    target_vcpu =most_likely_active(d);
    return vcpu_vlapic(target_vcpu);
}
while ((tmp&1)!=1)
{
tmp = tmp>>1;
    target_vcpu = target_vcpu+1;
}
if (tmp==0)
{
return vcpu_vlapic(target_vcpu);
}
while (tmp!=0)
{
    if ((tmp&1)==1)
saved_active_vcpu(target_vcpu);
tmp = tmp>>1;
```

```
    target_vcpu = target_vcpu+1;
}
target_vcpu = min_load_vcpu(saved_active_vcpu( ));
return vcpu_vlapic(target_vcpu);
}
```

The method for dynamic interrupt mapping based on the current active state of the VCPUs, provided by the invention, map the virtual interrupt into the active VCPU according to the current scheduling state of the VCPUs, and therefore, the interrupt request processing delay caused by scheduling delay is effectively reduced so as to ensure that the virtual interrupt is injected into the target VCPU in time, to obtain lower interrupt processing delay and to increase the interrupt response speed. When a plurality of VCPUs are in the active state, select the VCPU with the smallest interrupt load as the target VCPU to further ensure balancing of the interrupt processing loads of all VCPUs, so that the loads of VCPUs in the SMP structure are more symmetrical so as to promote balancing of the overall performance of all VCPUs in the SMP structure.

The scheme of the invention has no requirement shortening the length of the time slice of the scheduling period, increasing the context switch frequency of VCPUs or introducing a new seizing mechanism among VCPUs, so the invention does not cause waste of additional computing capability while effectively reducing the interrupt response delay, which benefits the operation of calculation intensive loads and ensures higher CPU utilization rate. Because the interrupt plays an important role in the operating system, increasing the interrupt processing rate can enhance the overall response capability of the virtual machine to a certain extent.

The preferable embodiments of the invention are described above. The ordinary technicians in the field can make revisions and modifications without creative work according to the conception of the invention shall be understood. Therefore, the technical schemes which can be obtained by the technicians in the technical field through logic analysis, deduction or limited experiment according to the conception of the invention based on the prior art shall be within the scope of protection determined by the Claim.

The invention claimed is:

1. A method for dynamic interrupt balanced mapping based on the current scheduling states of Virtual CPUs (VCPUs), comprising following steps:
   (a) whenever virtual hardware generates a virtual interrupt, a virtual I/O Advanced Programmable Interrupt Controller (APIC) receives the virtual interrupt and transmits the virtual interrupt to the virtual local APIC of a target VCPU;
   (b) an interrupt balanced allocator intercepts the virtual interrupt before the virtual interrupt is transmitted to the virtual local APIC of the target VCPU;
   (c) the interrupt balanced allocator analyzes the scheduling state information provided by a scheduler so as to obtain a list of the VCPUs in active state;
   (d) the interrupt balanced allocator reselects a target VCPU according to the list of the VCPUs in the active state;
   (e) the interrupt balanced allocator transmits the virtual interrupt to the virtual local APIC of the target VCPU reselected in step (d); and
   (f) the virtual local APIC of the target VCPU injects the virtual interrupt into the target VCPU;
   wherein the method for selecting the target VCPU in step (d) comprises following steps:
   (d1) obtain the number of the VCPUs in the list of the VCPUs in the active state;
   (d2) if the number is zero, select the target VCPU according to the scheduling state information; if the number is one, select the VCPU in the list of the VCPUs in the active state as the target VCPU; if the number is greater than one, select the target VCPU according to the interrupt loads of the VCPUs in the list of the VCPUs in the active state.

2. The method of claim 1, wherein the method for selecting the target VCPU according to the scheduling state information in step (d2) comprises following steps:
   (d2.1) read the scheduling state information; and
   (d2.2) select a VCPU predicted to enter the active state fastest from all the VCPUs as the target VCPU.

3. The method of claim 2, wherein in step (d2.2), the VCPU entering the active state fastest is predicted based on that the VCPU is in the idle state.

4. The method of claim 2, wherein if all the VCPUs are not in the idle state, the VCPU entering the active state fastest in step (d2.2) is predicted based on position in a waiting queue and remaining credit value of the VCPUs.

5. The method of claim 1, wherein the method for selecting the target VCPU according to the interrupt loads of the VCPUs in the list of the VCPUs in the active state in step (d2) comprises the following steps:
   (d2.3) read a VCPU interrupt load list maintained by the current virtual machine structure;
   (d2.4) compare the interrupt loads of the VCPUs in the list of the VCPUs in the active state to select the VCPU with smallest interrupt load as the target VCPU.

6. The method of claim 1, wherein the virtual hardware in step (a) comprises virtual devices and/or physical devices with interrupt being processed by the Virtual Machine Monitor.

7. The method of claim 1, wherein the virtual interrupt is injected by means of a Virtualization Technology eXtension event injection in step (f).

8. The method of claim 1, wherein a member variable sched_info is added on basis of SHARED_INFO structure of the virtual machine so as to record the scheduling states of the VCPUs.

9. The method of claim 8, wherein whenever the scheduler switches the VCPUs once, after the swap-in VCPU and the swap-out VCPU complete context switch, the swap-in VCPU becomes the active VCPU, the member variable sched_info of the SHARED_INFO structure of the virtual machine which the active VCPU belongs to is marked as active, and the member variable sched_info of the SHARED_INFO structure of the virtual machine which the swap-out VCPU belongs to is marked as waiting.

* * * * *